United States Patent [19]

Hochradel et al.

[11] 4,006,868
[45] Feb. 8, 1977

[54] CARRIER FOR PNEUMATIC TUBE SYSTEM

[75] Inventors: Ernest Hochradel, Sparta; Werner Hauer, Nutley; Victor J. Vogel, Oak Ridge, all of N.J.

[73] Assignee: The Mosler Safe Company, Hamilton, Ohio

[22] Filed: July 28, 1975

[21] Appl. No.: 599,368

[52] U.S. Cl. .................. 243/34; 220/306; 220/335; 243/39
[51] Int. Cl.² ........................ B65G 51/06
[58] Field of Search .......... 243/32, 33, 34, 35, 243/39; 220/306, 335

[56] References Cited
UNITED STATES PATENTS

| | | | |
|---|---|---|---|
| 242,459 | 6/1881 | Leaycraft | 243/32 |
| 726,022 | 4/1903 | Burton | 243/33 |
| 2,104,093 | 1/1938 | Needham | 243/39 X |
| 2,912,066 | 11/1959 | Ellithorpe | 243/34 X |
| 3,231,218 | 1/1966 | Tearne | 243/19 X |
| 3,355,088 | 11/1967 | Young | 220/335 X |
| 3,593,948 | 7/1971 | McClellan | 243/34 |
| 3,733,037 | 5/1973 | Vandiveer | 243/35 |

Primary Examiner—Evon C. Blunk
Assistant Examiner—James L. Rowland
Attorney, Agent, or Firm—Wood, Herron & Evans

[57] ABSTRACT

A carrier for transporting articles in a pneumatic tube system including, in one preferred embodiment, an elongated cylindrical body completely closed at one end and having an opening in the side wall thereof extending from the other end of the carrier a substantial distance along the length thereof, but substantially less than the entire carrier length, and having a width measured circumferentially approximately one-half of the carrier circumference. A semi-cylindrical cover is hinged to the carrier body along one longitudinal edge thereof to selectively close the opening in the side wall. Also included are mating semi-circular discs integral with the outer ends of the semi-cylindrical cover and cylindrical body section which cooperate to seal the end of the carrier adjacent the side wall opening when the semi-cylindrical cover is in its closed position sealing the side wall opening. Other embodiments are also disclosed.

13 Claims, 8 Drawing Figures

CARRIER FOR PNEUMATIC TUBE SYSTEM

This invention relates to carriers for transporting articles in a pneumatic tube.

Carriers for transporting articles in pneumatic tubes, from the standpoint of the manner in which they open to provide access to the interior thereof, are of three basic types. The first type, commonly known as the "clam shell" style, comprehends a carrier in which the tubular carrier body is divided along its entire length into two longitudinal sections which are hinged along a common longitudinal edge. This enables the two longitudinal one-half sections to pivot between open and closed positions in much the same fashion as a clam shell. The second principle type of carrier construction, known as the end-opening type, contemplates providing a tubular carrier body, which is permanently closed along its entire length as well as at one end, with a movable closure plate at its other end which pivots between open and closed positions about a longitudinal axis parallel to and spaced from the carrier axis. Thus, the end plate pivots between a closed position sealing the otherwise open carrier end, an and open position in which the interior of the carrier is exposed and accessible through the open carrier end. The third type of carrier, known as the "alligator" type, typically includes a tubular body permanently closed at both ends as well as for substantial portions of its length extending inwardly from each end. A substantial portion of the tubular body located intermediate, and spaced from, the permanently closed carrier ends is provided with an opening which has a cover pivotally mounted to the carrier body along an edge of the opening transverse to the longitudinal axis of the carrier.

Carriers of the end-opening, alligator, and clam shell types have distinct and different disadvantages. Specifically, end-opening carriers provide a relatively small, constricted access opening to the carrier interior, making it relatively difficult to load the carrier with certain types of articles, for example, flexible bags filled with fluid which have no defined shape, such as plastic bags containing an intravenous feeding used by hospitals. Carriers of the clam shell type, while easily loaded with fluid-filled plastic bags, cannot be conveniently loaded with rolled-up items such as newspapers or magazines which have a tendency to unroll and expand radially. For example, a rolled-up magazine placed in one-half of a clam shell carrier has a tendency to partially unroll and expand radially before the other one-half section of the carrier can be placed in its closed position, rendering it difficult to close the carrier. Alligator type carriers cannot be conveniently loaded with stiff, non-bendable articles having a length coextensive with that of the carrier. For example, a tightly rolled-up magazine, which is sufficiently stiff to prevent being bent, cannot be placed inside an alligator type carrier if its length is approximately equal to that of the carrier, because the opening is too small.

Accordingly, it has been an objective of this invention to provide a carrier having a construction which facilitates convenient loading of both rolled-up articles, such as magazines, which have a tendency to radially expand, amorphous-shaped articles, such as fluid-filled flexible bags, and stiff, unbendable lengthy articles, such as tightly rolled-up magazines having a length approximately equal to that of the carrier. This objective has been accomplished in accordance with certain aspects of the invention by providing a carrier which for a substantial portion of its length is in the form of a closed end tubular section and which for the remaining substantial portion of its length is provided with a large opening in the wall thereof adapted to be sealed by either a clam shell or alligator type cover. By reason of the large opening and associated clam shell or alligator type cover, direct access to a substantial portion of the carrier interior is permitted for loading both large amorphous-shaped articles, such as fluid-filled flexible bags, as well as stiff, lengthy unbendable articles, such as tightly rolled-up magazines having a length approximating that of the carrier, while the substantial length closed end tubular section facilitates convenient loading of rolled-up articles, such as magazines, which have a tendency to expand. Hence, a carrier construction is provided having the advantages of clam shell, alligator and end-opening constructions, yet without the disadvantages of any one of them. More specifically, the carrier of this invention can be conveniently loaded with articles which heretofore could be conveniently loaded in only one or the other types of carrier constructions, but not all, namely, plastic bags which could be conveniently loaded in alligator and clam shell carriers, and lengthy, unbendable, expanding, rolled-up articles which could be conveniently loaded only in end-opening carriers.

In accordance with a further aspect of the invention a very simple locking mechanism is provided for maintaining the clam shell cover in its closed position. Specifically, and in accordance with a preferred embodiment of the invention, the locking mechanism includes a recess formed in the cover proximate its unhinged longitudinal edge and a cooperating ridge formed in the carrier body proximate the longitudinal edge thereof opposite its hinged edge. The recess in the cover and ridge on the body selectively interengage when the cover is in the closed position, locking the cover in place. The selectively interengaging groove and ridge locking mechanism have no moving parts and can be provided very inexpensively, particularly when the carrier cover and body are injection molded and the groove and ridge are formed as an incident of the injection molding process.

These and other advantages and objectives of the invention will become more readily apparent from a detailed description thereof taken in conjunction with the drawings in which.

Figure 1:
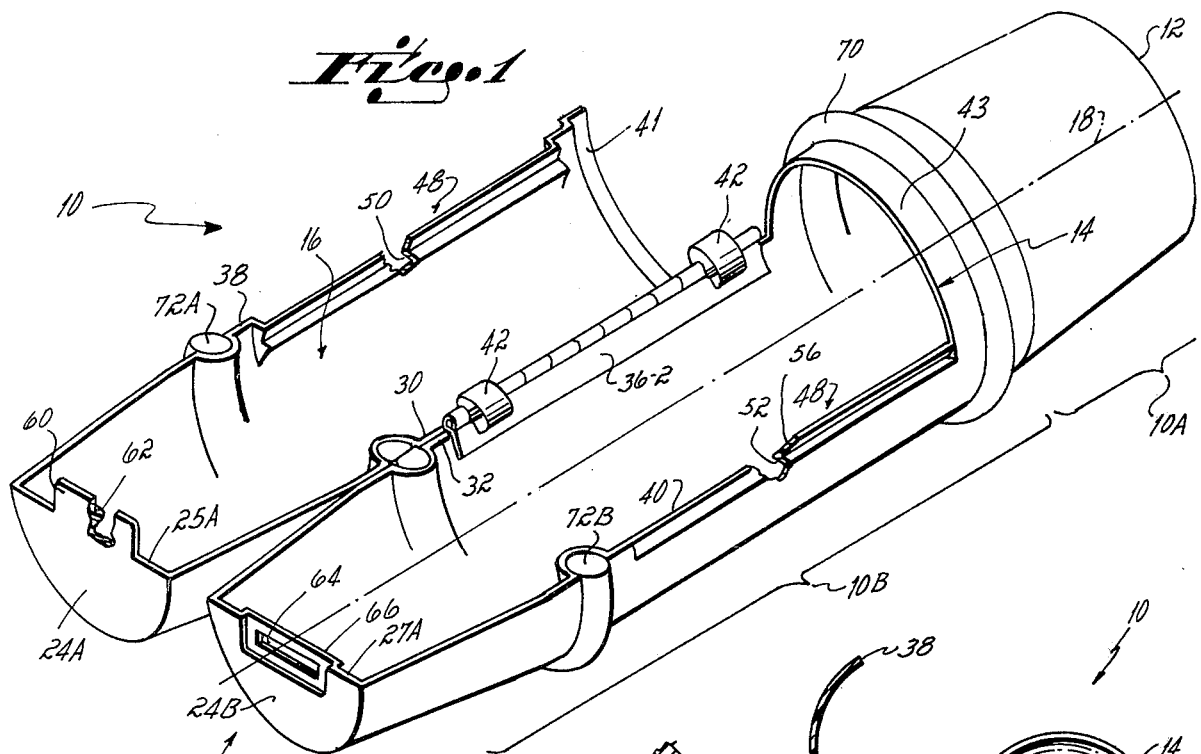
FIG. 1 is a perspective view of the carrier with the semi-cylindrical cover in the open position rendering the carrier interior region accessible for insertion and-/or removal of an article.

As shown in FIG. 1, a preferred embodiment of the carrier of this invention generally includes an elongaged tubular body 10, preferably circular in cross-section, having a permanently closed or sealed end 12. The carrier body 10 is provided with an opening 14 in the cylindrical side wall thereof which is selectively closable with a semi-cylindrical cover 16. The opening 14 has a length measured along the longitudinal axis 18 of the carrier which is a substantial fraction of the total carrier length, but substantially less than the entire carrier length, and a width measured in a circumferential direction which is also a substantial fraction of the circumference of the carrier, but substantially less than the entire carrier circumference. Preferably the length of the opening 14 is approximately 50%–75% of the total carrier length, while the width is approximately 35%–65% of the circumference of the carrier. In the preferred embodiment, the opening 14 has a length approximately 65% of the carrier length and a width measured circumferentially approximately 50% of the carrier circumference. With an opening so dimensioned, the carrier is provided, when the cover 16 is open, with a closed tubular section 10A of substantial length, e.g., approximately 25% of the carrier length measured along axis 18. The advantage of a closed tubular section 10A in combination with a selectively accessible opening 14, both of substantial length will become apparent hereafter.

The end 20 of the carrier body 10 opposite permanently closed carrier end 12, when the cover 16 is in its closed position (not shown) sealing opening 14, is sealed by closure means 24 integrally connected to at least the cover 16 or the tubular carrier body 10. Preferably the closure means 24 includes two semi-circular discs 24A and 24B formed integral with the cover 16 and tubular body 10, respectively.

Figure 6:
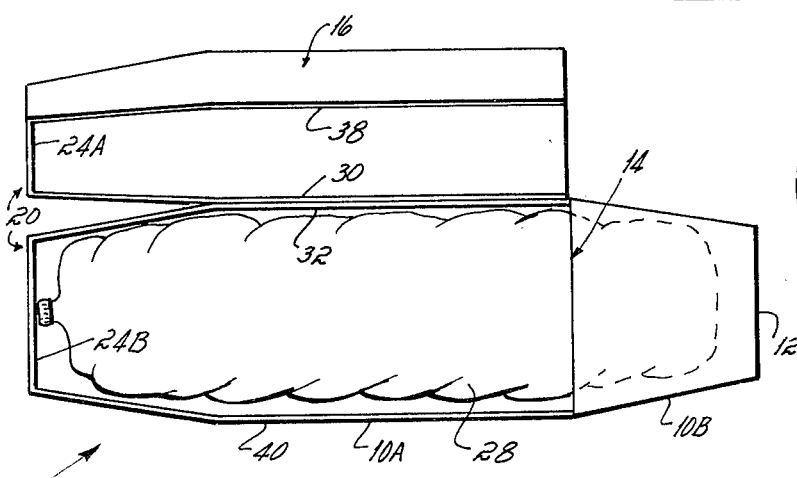
FIG. 6 is a side elevational view of the carrier showing the cover in the open position and a fluid-containing flexible bag positioned in the carrier interior region.

With the opening 14 in the tubular carrier body 10 dimensioned as described, when the cover 16 is in its open position as shown in FIG. 1 (and also in FIG. 6), the carrier exhibits the advantageous characteristics, but not the disadvantageous characteristics, of both a carrier of the "clam shell" type and of the "end-opening" type. Specifically, with the opening 14 dimensioned as described, a substantial portion of the carrier interior region is directly accessible through the opening 14 when the cover 16 is open, enabling large objects such as a fluid-filled flexible plastic bag 28 of amorphous shape to be easily inserted into the carrier. This is an advantageous characteristic typical of carriers of the "clam shell" type, but not of the end-opening type. In addition, with the opening 14 dimensioned as described, the carrier of the invention also has the advantage, when the cover 16 is in the open position, of having a substantial portion 10A of the carrier body 10 retain its cylindrical shape, enabling rolled-up articles such as magazines or the like to be partially inserted into the tubular carrier section 10A and retain their rolled-up configuration while the cover 16 is being closed. This is an advantage normally found only with end-opening carriers, and not with clam shell carriers. Further, since the opening 14 is adjacent the cylindrical body section 10A, when a rolled-up article having a length approximating that of the carrier body 10 is located in section 10A, a substantial portion of the article extends into body section 10B, permitting it to be easily grasped and removed when the rolled-up article-bearing carrier has reached its destination. With carriers of the end-opening type, a rolled-up article once inserted into the carrier is often difficult to remove since no portion of it projects out of the carrier end after it has been inserted and the end cover closed.

The elongated tubular body 10 is preferably an injection molded plastic member. As such, the cylindrical body section 10A, permanently closed end 12, semi-cylindrical body section 10B, and the semi-circular end closure disc 24B constitute a one-piece construction. The cover 16 and semi-circular end closure disc 24A are also preferably injection molded plastic and constitute a one-piece construction.

The cover 16 has a longitudinal edge 30 parallel to carrier axis 18 which is pivotally connected to a longitudinal edge 32 of tubular body 10 which is also parallel to carrier axis 18 by means of a connector 36, preferably an elongated hinge having pivotally connected hinge plates 36-1 and 36-2 secured to the cover 16 and body section 10B, respectively. The hinge 36 permits the cover 16 to pivot between an open position (shown in FIGS. 1 and 6) in which the interior region of the elongated tubular body 10 is accessible for insertion or withdrawal of articles to be transported by the carrier, and a closed position (not shown) in which the cover 16 overlies the tubular carrier body section 10B with an edge 38 of cover 16 overlying the edge 40 of tubular body section 10B. Edges 38 and 40 are parallel to carrier axis 18. When the cover 16 is in the closed position, edges 25A and 27A of semi-circular end closure discs 24A and 24B are in mating relationship, sealing the end 20 of the carrier 10. Additionally, flange 41 on the inner end of the cover 16 overlies a portion 43 of the inner end of body section 10A to seal the joint therebetween. Thus, with the cover 16 and integral end disc 24A in the closed position, the interior of the carrier is completely sealed by the combined, or collective action, of cover 16 closing opening 14 in the side wall of the elongated tubular body 10 and semi-circular disc 24A closing the otherwise partially open end 20 of the carrier 10.

Figures 2, 3, 4, 5:
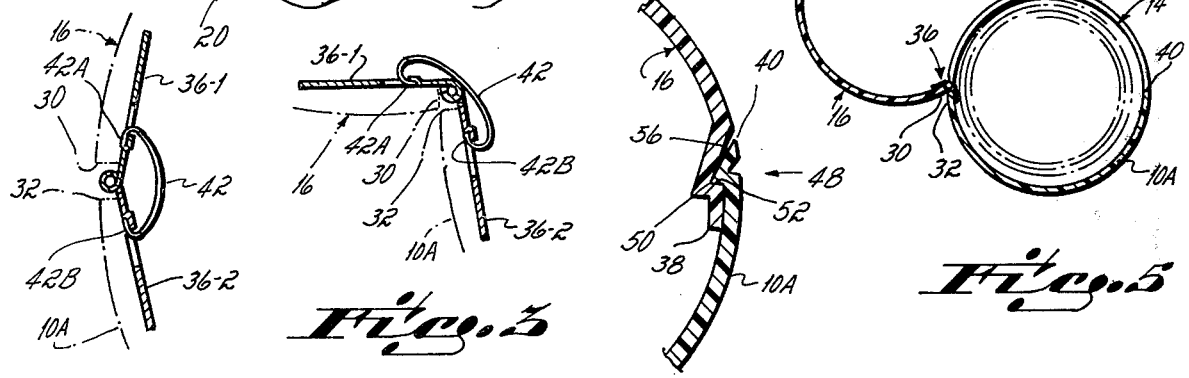
FIG. 2 is a cross-sectional view through the cover hinge of a portion of the carrier showing the bistable bias means tending to maintain the cover in a closed position.
FIG. 3 is a cross-sectional view through the cover hinge of a portion of the carrier showing the bistable bias means tending to maintain a cover in an open position.
FIG. 4 is a cross-sectional view through the cover and tubular carrier body in the region of the cover locking means.
FIG. 5 is a cross-sectional view through the carrier with the cover in the open position.

To assist in maintaining the cover 16 in its open position, or alternatively to assist in maintaining the cover 16 in its closed position, a pair of bistable bias elements 42,42 each in the form of a C-shaped spring member, are associated with the cover 16 and body section 10B proximate edges 30 and 32. As shown best in FIGS. 2 and 3, the bistable bias elements 42, 42 have inwardly projecting ends 42A and 42B which engage the outer longitudinal edges 36A and 36B, respectively, of the hinge plates 36-1 and 36-2, respectively. When the cover 16 is in the open position shown in FIG. 3 the spring elements 42,42 assist in maintaining the cover in such open position by applying a counterclockwise moment to the cover about the longitudinal axis of the hinge 36. Alternatively, when the cover 16 is in the closed position shown in FIG. 2, the spring bias elements 42,42 apply a clockwise moment to the cover 16 about the longitudinal axis of the hinge 36, tending to maintain it in a closed position. The spring elements 42,42 also have a tendency to urge the cover into its closed position once the cover 16 has been moved from its open position (FIG. 3) toward its closed position past an intermediate position (not shown) wherein the hinge plates 36-1 and 36-2 are coplanar. A similar result occurs, but in the opposite direction, when the cover is moved from its closed position to its open position.

To lock the cover 16 in its closed position with respect to the elongated body section 10B, a locking mechanism 48 is provided. The lock mechanism 48 includes an elongated groove or recess 50 in the exterior of body section 10B disposed parallel to the carrier axis 18 proximate body section edge 40, and an inwardly projecting ridge 52 formed in the cover 16 proximate the edge 38 also extending in a direction parallel to the carrier axis 18. When the cover 16 is in the closed position and cover edge 38 overlies tubular body edge 40, ridge 52 releasably interengages, or seats, in the groove 50. The inclined surface 56 located between the edge 40 and ridge 52 on the tubular body section 10B functions as a cam surface to facilitate engagement of the ridge 52 in groove 50 when the cover 16 is moved to its closed position shown in FIG. 4.

Disengagement of the ridge 52 and groove 50 when it is desired to open the cover 16 is accomplished by holding the tubular section 10A stationary with one hand and applying a counter-clockwise moment about hinge 36 to cover 16 with the other hand. Since the tubular body 10 and cover 16 are made of relatively thin-walled plastic material which is flexible, the application of a counterclockwise moment to the cover 16 relative to the tubular body section 10A is effective to deflect the ridge 52 radially outwardly out of engagement with the groove 50 which deflects inwardly as a torque is applied to the cover to move it to its open position. Similarly, when the cover 16 is moved to its closed position, the cover 16 and body section 10B in the region of the edges 38 and 40 deflect to permit engagement of the ridge and groove 50 and 52.

To further assist in locking the cover 16 in its closed position the semi-circular closure disc 24A is provided with a tab 60 extending radially outwardly from the disc edge 25A. Tab 60 is provided with an inwardly and axially extending projection or ridge 62. Also provided, and cooperating with the ridge 62 on tab 60, is a groove 64 formed in an axially inwardly offset portion 66 of the semi-circular closure end disc 24B proximate the edge 27A. When the cover is moved to its closed position, ridge 62 seats in groove 64 to facilitate locking the cover in the closed position. By reason of the fact that the cover 16, particularly end wall 24A, is fabricated of relatively thin plastic material, when the cover is moved to its closed position the tab 60 deflects axially outwardly to permit the ridge 62 to engage groove 64. The tab 60 also deflects axially outwardly permitting the ridge 62 to disengage the groove 64 when the cover 16 is moved from its closed position to its open position. There is also inward axial deflection of end disc section 66 when the cover tab ridge 62 engages and disengages groove 64.

An O-ring 70 seats in a circumferential groove found in the exterior of body section 10A to provide an air seal when the carrier is being conveyed in a pneumatic tube. Similarly, split O-ring sections 72A and 72B seat in circumferential grooves formed in cover 16 and body section 10B to further enhance the air seal between the carrier and pneumatic tube.

Figure 7:
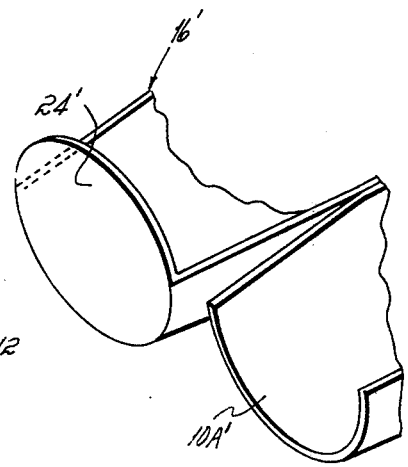
FIG. 7 is a perspective view of a modified carrier end construction.

If desired, the two closure discs 24A and 24B could be formed into a single disc 24' integral with the cover 16, as shown in FIG. 7. In this manner when the cover 16 is in its open position the entire end 20 of tubular body 10 is unobstructed to facilitate more convenient loading of the carrier with rolled-up articles having a length and circumference substantially coextensive with that of the interior region of the carrier.

Figure 8:
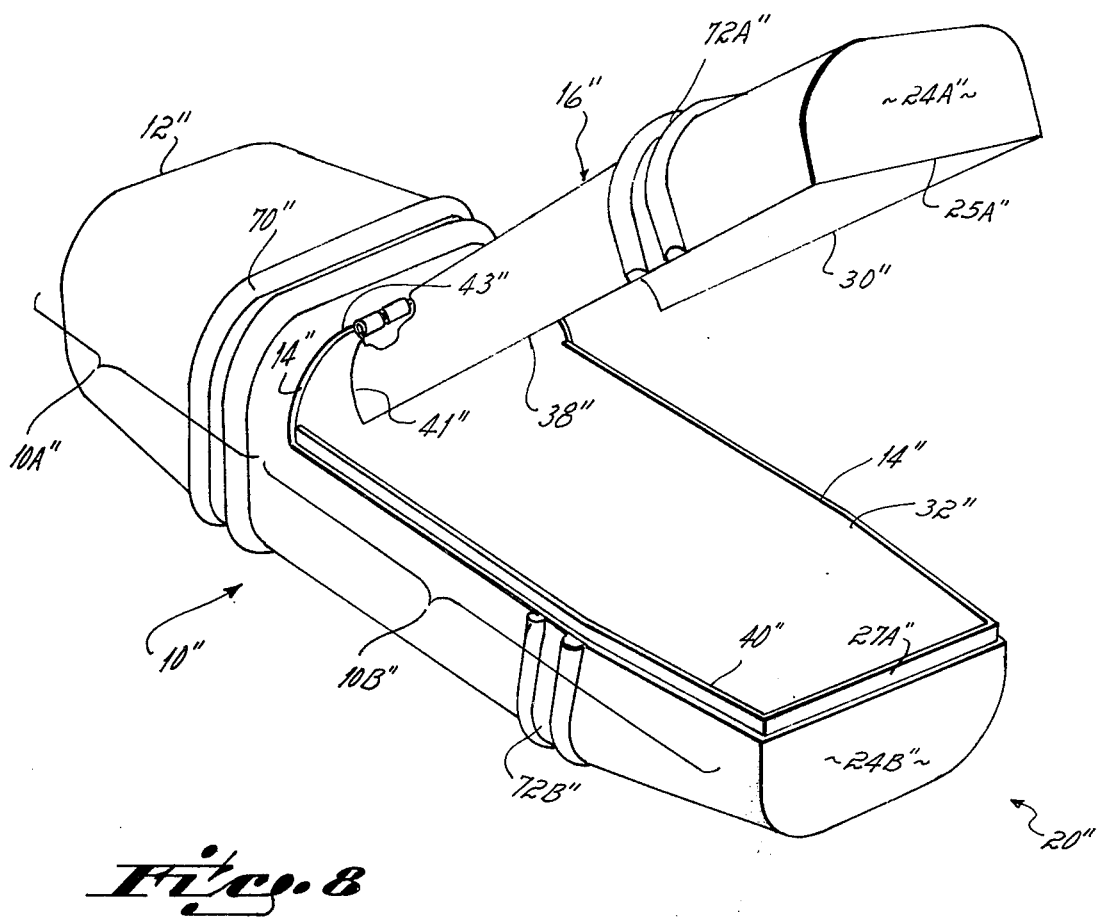
FIG. 8 is a perspective view of another modified carrier construction.

If desired, the cover 16 of the carrier shown in the embodiment of FIGS. 1–6, instead of being hinged along its longitudinal edge 30 to edge 32 of carrier body section 10B, may be hinged along an edge transverse to the longitudinal axis of the carrier as shown in FIG. 8. Specifically, and with reference to FIG. 8, a tubular carrier body 10", in this case having a generally oval cross-section, is shown. Carrier body 10" includes a tubular section 10A" having a permanently closed end 12" and an open end 14". Body 10" also includes a tubular section 10B" which is provided with an opening 14" which extends along the entire length of section 10B", which section 10B" constitutes a substantial portion of the entire carrier length between permanently closed end 12" thereof and partially openable end 24". Opening 14", while extending a substantial distance along the length of the carrier 10", has a length which is substantially less than the entire length of the carrier.

Opening 14" is provided with a cover 16". The cover 16" has its inner edge 41" pivotally connected to the inner edge 43" of the carrier section 10A". A bistable hinge of the type shown in the embodiment of FIGS. 1–6 could be utilized, and if utilized, would tend to maintain the cover 16", which is of the alligator type, alternatively in either the open position (shown in FIG. 8) or the closed position (not shown). In the closed position the cover 16" seals the opening 14" by reason of the interfit of longitudinal edges 30" and 38" thereof in shoulder-forming longitudinal edges 32" and 40" formed in tubular body section 10B" proximate opening 14". Additionally, in the closed position, closure end member 24A" formed integral with the outer end of the cover 16" cooperates with closure end member 24B" formed integral with the carrier body section 10B" to seal the end 20" of the carrier. In the closed position, edge 25A" of closure member 24A" interfits in shoulder-forming edge 27A" formed in closure member 24B".

To maintain the cover 16" in the closed position any suitable looking arrangement can be utilized. For example, lock members 48 of the type described in connection with the embodiment FIGS. 1–6 could be provided along the longitudinal edges of the cover 16" and body 10B" and/or a closure member 60, 62, 64, 66 of the type shown in FIGS. 1–6 could be provided at the carrier end 20" to lock end closure members 24A" and 24B". Alternatively, a push button or slide type lock, well known in the art, could be mounted to the closure end members 24A" and 24B" to maintain cover 16" in its closed position.

To provide an air seal between the carrier and the pneumatic tube in which the carrier is being transported, a suitable O-ring member 70" is provided in an appropriately configured circumferential groove in the carrier body section 10A", along with O-ring members 72A" and 72B" provided in suitably configured circumferential grooves formed in the cover 16" and carrier body 10B", respectively. The O-ring members may be made of any suitable material such as nylon felt.

What is claimed is:

1. A carrier for transporting articles through a pneumatic tube comprising:
   a major body member including,
   a. a tubular section having a completely closed outer end and a completely open inner end, b. a first semi-tubular section having a completely open inner end integrally connected to said tubular section inner end, an outer end, and a pair of side edges, a minor body member having a second semi-tubular section with a completely open inner end, an outer end, and a pair of side edges, a connector pivotally interconnecting one of said side edges of said first semi-tubular section and one of said side edges of said second semi-tubular section for facilitating movement of said semi-tubular sections between a) a closed position in which both said semi-tubular sections cooperate to define an enclosed tubular region, and b) an open position in which semi-tubular sections are juxtaposed, end closure means integrally connected to at least one of said outer ends of said semi-tubular sections to seal said outer ends of said semi-tubular sections when positioned in said closed position, at least part of said end closure means being connected for movement with said outer end of said second semi-tubular section to provide endwise access to the interior of said tubular section when said semi-tubular sections are positioned in said open position.

2. The carrier of claim 1 wherein one of said semi-tubular sections includes a recess formed therein proximate said other of its edges, and wherein the other of said semi-tubular sections includes a projection formed therein proximate said other of its edges, said recess and projection releasably interengaging to selectively lock said semi-tubular sections in said closed position.

3. The carrier of claim 2 wherein said recess includes a longitudinal groove formed in the exterior of said one of said semi-tubular sections disposed generally parallel to said other of its edges, and wherein said projection includes an outwardly projecting elongated longitudinal ridge formed in the exterior of said other of said semi-tubular sections disposed generally parallel to said other of its edges.

4. The carrier of claim 2 wherein said closure means includes first and second closure sections integrally connected with the outer ends of said first and second semi-tubular sections, respectively, said closure sections collectively sealing the outer end of said semi-tubular sections when in their closed position, and wherein one of said closure sections includes a recess formed therein and the other of said closure sections includes a projection formed therein, said recess and projection releasably interengaging to selectively lock said first and second closure sections when said semi-tubular sections are in their closed position.

5. The carrier of claim 2 wherein said connector includes a hinge, and further including bistable bias means interconnecting said first and second semi-tubular sections proximate said hinge for assisting in maintaining said semi-tubular sections alternatively in said open and closed positions.

6. The carrier of claim 1 wherein said closure means includes first and second closure sections integrally connected with the outer ends of said first and second semi-tubular sections, respectively, said closure sections collectively sealing the outer end of said semi-tubular sections when in their closed position, and wherein one of said closure sections includes a recess formed therein and the other of said closure sections includes a projection formed therein, said recess and projection releasably interengaging to selectively lock said first and second closure sections when said semi-tubular sections are in their closed position.

7. A carrier for transporting articles in a pneumatic tube comprising:

an elongated one-piece injection molded plastic tubular body member having a first end and a completely closed second end, said member having an opening in the side thereof along a substantial fraction of its length and circumference, said opening having a width measured circumferentially and a length substantially less than the entire circumference and length, respectively, of said body member, said opening having one end proximate said first end of said tubular body member and an opposite end intermediate said first and second ends, a side cover configured to close said opening when placed thereover, a connector pivotally interconnecting said side cover and tubular body member for facilitating pivotal movement of said cover between an open position and a closed position, and an end closure integral with at least one of said side cover and tubular members for sealing, in combination with said cover when placed in its closed position, the enclosed tubular region collectively defined by said tubular body member and closed side cover, at least part of said end closure being connected for movement with said side cover to provide endwise access to the interior of said tubular body member when said side cover is in said open position.

8. The carrier of claim 7 wherein said end closure includes first and second selectively mating closure elements integral with said cover and tubular member, respectively, for cooperatively closing said first end of tubular member when in mating relationship.

9. The carrier of claim 7 wherein said connector includes a hinge, and further including bistable bias means interconnecting said tubular body member and cover proximate said hinge for assisting in maintaining said tubular body member and cover alternatively in said open and closed positions.

10. The carrier of claim 7 wherein said connector pivotally interconnects said cover and body for pivotal movement about an axis generally transverse to the longitudinal axis of said carrier at a point proximate said opposite end of said opening intermediate said first and second ends of said tubular body.

11. The carrier of claim 7 wherein said opening and cover have longitudinally directed opposite sides which mate when said cover closes said opening, and wherein said connector pivotally interconnects said cover and body along one of their mating longitudinal sides for pivotal movement about an axis generally parallel to the longitudinal axis of said carrier.

12. A carrier for transporting articles through a pneumatic tube comprising:

a major body member including:

a. a tubular section having a completely closed outer end and a completely open inner end, b. a first semi-tubular section having a completely open inner end integrally connected to said tubular section inner end, an outer end, and a pair of side edges, a minor body member having a second semi-tubular section with a completely open inner end, an outer end, and a pair of side edges, a connector pivotally interconnecting said tubular section proximate its open inner end said minor body member proximate its inner end for facilitating movement of said semi-tubular section between a) a closed position in which both said semi-tubular sections cooperate to define an enclosed tubular region, and b) an open position in which the longitudinal axes of said semi-tubular sections are substantially angulated relative to each other, end closure means integrally connected to at least one of said outer ends of said semi-tubular sections to seal said outer ends of said semi-tubular sections when said semi-tubular sections are positioned in said closed position, at least part of said end closure means being connected for movement with said outer end of said second semi-tubular section to provide endwise access to the interior of said tubular section when said semi-tubular sections are in said open position.

13. A carrier for transporting articles through a pneumatic tube comprising:

a major body member including, a. a tubular section having a completely closed outer end and a completely open inner end, b. a first partial-tubular section having an open inner end integrally connected to said tubular section inner end, an outer end, and a pair of side edges, a minor body member having a second partial-tubular section with an inner end, an outer end, and a pair of side edges, a connector pivotally interconnecting said first partial-tubular section and said second partial-tubular section along mating edges thereof for facilitating movement of said partial-tubular sections are spaced apart along a substantial portion of their length to facilitate access to the interior of said major body member, end closure means integrally connected to at least one of said outer ends of said semi-tubular sections to seal said outer ends of said semi-tubular sections when positioned in said closed position, at least part of said end closure means being connected for movement with said outer end of said first partial-tubular section to provide endwise access to the interior of said tubular section when said partial-tubular sections are in said open position.

* * * * *

Page 1 of 2

UNITED STATES PATENT AND TRADEMARK OFFICE
CERTIFICATE OF CORRECTION

PATENT NO. : 4,006,868
DATED : February 8, 1977
INVENTOR(S) : Ernest Hochradel et al It is certified that error appears in the above-identified patent and that said Letters Patent are hereby corrected as shown below:

| | | | |
|---|---|---|---|
| Col. 1 | Line 24 | "an and" | should be --and an-- |
| Col. 7 | Line 41 | "2" | should be --1-- |
| Col. 7 | Line 59 | "1" | should be --2-- |
| Col. 8 | Line 23 | "members" | should be --body member-- |
| Col. 8 | Line 34 | "tubular member" | should be --tubular body member-- |
| Col. 8 | Line 36 | "tubular member" | should be --said tubular body member-- |
| Col. 8 | Line 45 | "and body" | should be --and tubular body-- |
| Col. 8 | Line 45 | "body for" | should be --body member for-- |
| Col. 8 | Line 49 | "tubular body" | should be --tubular body member-- |
| Col. 8 | Line 54 | "body" | should be --tubular body member-- |
| Col. 9 | Line 2 | "end said" | should be --end and said-- |
| Col. 9 | Line 4 | "section" | should be --sections-- |

UNITED STATES PATENT AND TRADEMARK OFFICE
CERTIFICATE OF CORRECTION

PATENT NO. : 4,006,868
DATED : February 8, 1977
INVENTOR(S) : Ernest Hochradel et al It is certified that error appears in the above-identified patent and that said Letters Patent are hereby corrected as shown below:

Col. 10 Line 12 "sections are" should be --sections between a) a closed position in which both said partial-tubular sections cooperate to define an enclosed tubular region, and b) an open position in which said partial-tubular sections are--

Col. 10 Line 17 "semi" should be --partial--

Col. 10 Line 18 "semi" should be --partial--.

Signed and Sealed this

Twenty-ninth Day of November 1977

[SEAL]

Attest:

RUTH C. MASON
*Attesting Officer*

LUTRELLE F. PARKER
*Acting Commissioner of Patents and Trademarks*